Patented July 11, 1950

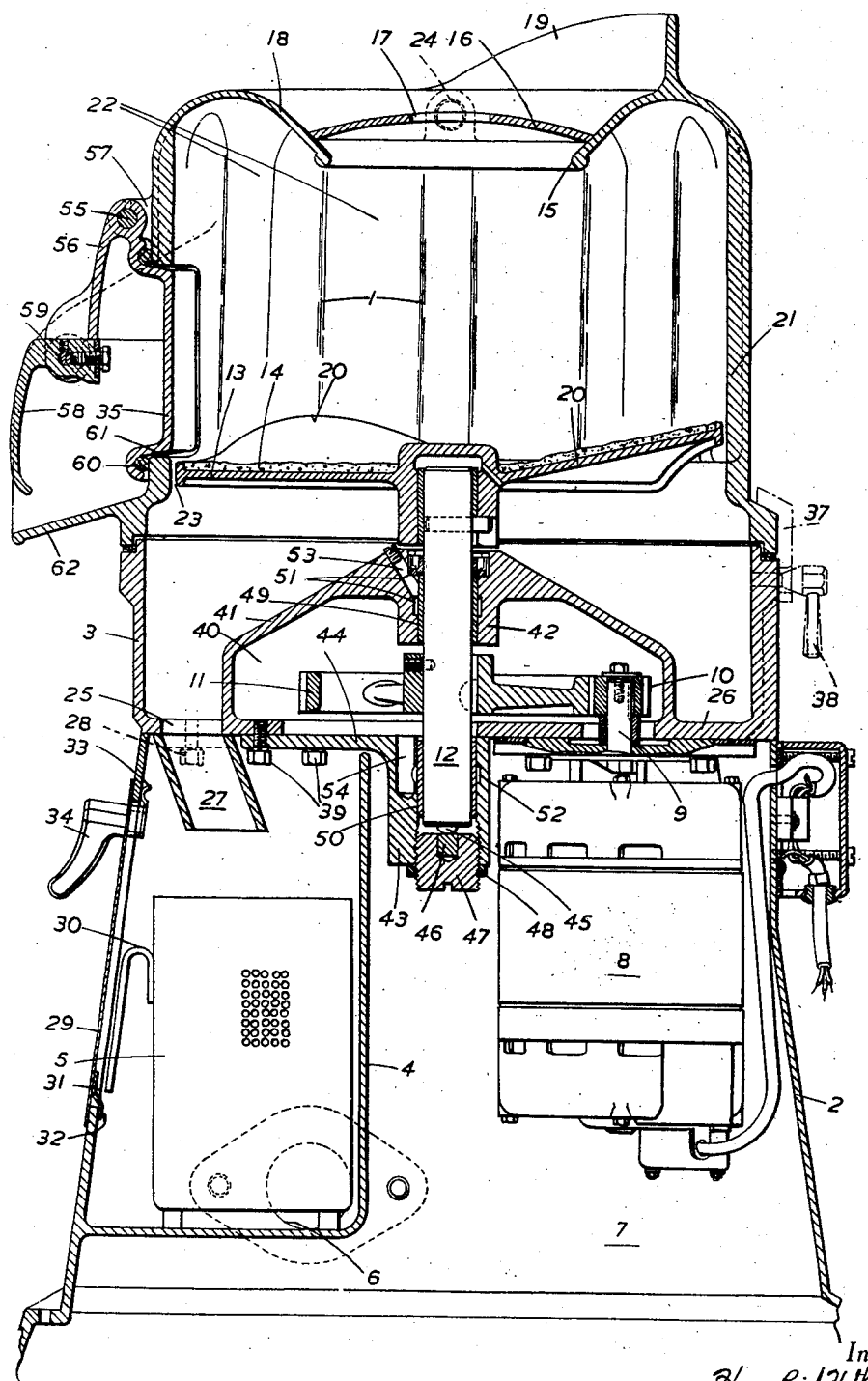

2,514,493

UNITED STATES PATENT OFFICE 2,514,493

MACHINE FOR PEELING AND CLEANING VEGETABLES AND FRUITS

Harry Reid Hetherington, New Southgate, London, England, assignor to The Hobart Manufacturing Company, Troy, Ohio, a corporation of Ohio Application May 11, 1945, Serial No. 593,132
In Great Britain May 18, 1944

4 Claims. (Cl. 146—50)

The present invention relates to machines for peeling and cleaning vegetables and fruits, particularly root vegetables, and has for its chief object to provide an improved machine for this purpose which is so constructed that the possibility of damage to the machine due to interruption of the flow of flushing fluid on account of accumulation of peelings in the machine is reduced to a minimum.

With this object in view the present invention consists in a machine for peeling and cleaning vegetables and fruits in which a peel trap or interceptor is incorporated in the machine between the hopper in which peeling and cleaning of the vegetables and fruits is effected and the outlet for the flushing fluid.

More specifically stated the present invention consists in a machine for peeling and cleaning vegetables and fruits comprising an enclosed base which is partitioned internally to provide separate enclosed spaces in which a prime mover and a strainer are housed, the prime mover being arranged to drive a vertically disposed shaft carrying a disc-like element provided with an abrasive surface operatively disposed in relation to a tubular hopper to which the vegetables or fruits are fed in such wise that the peel and other refuse is removed from the vegetables or fruit and passed below the disc together with a hopper flushing fluid to the strainer which retains the solid particles and separates the fluid for draining through an outlet.

One practical embodiment of the invention is shown, by way of example, in the accompanying drawing, which represents a vertical cross sectional elevation of the machine.

The machine comprises a tubular hopper 1 mounted vertically on a pedestal consisting of a tapered cylindrical base 2 surmounted by a hopper support 3. The base 2 is formed internally with a peel trap housing 4 thus dividing the interior of the base 2 into two compartments. One compartment is the peel trap housing 4 which accommodates the strainer 5 and has a drain outlet 6 leading therefrom. The other compartment 7 forms a housing for an electric motor 8. The electric motor 8 is disposed with its shaft 9 vertical and parallel to the vertical axis of the machine, and is arranged to drive through a pinion wheel 10 and a spur gear wheel 11 having teeth of spiral or helical form, a vertical shaft 12 disposed coincident with the vertical axis of the machine and upon which is mounted a disc-like turn-table 13 provided with an abrasive surface 14. To reduce noise in operation the pinion 10 is of the fabric type. The turn-table 13 occupies a position near the lower end of the tubular hopper 1 and opposite to a centrally disposed aperture 15 through which the vegetables or fruits are adapted to be fed into the hopper 1. While the machine is in use the aperture 15 is closed by a loose lid 16 provided with a finger hole 17. The aperture 15 is provided at the base of a conical chute 18 and is partly surrounded by a fence 19 to prevent the charge of vegetables or fruits dropping over to the back of the machine during the charging operation. The surface 14 of the turn-table 13 is a coating of an abrasive material, e. g., fine Carborundum grain, and is formed with a series of undulations or "humps" 20 for the purpose of assisting in turning the vegetables or fruits over and preventing any one part thereof being subjected to more than its due share of abrasive action. The cylindrical wall 21 of the hopper 1 is formed internally with flutes 22 to assist in turning the vegetables and fruits as described and claimed in the specification of British Patent No. 334,728.

A clearance gap 23 is provided between the periphery of the turn-table 13 and the inner fluted wall 21 of the hopper 1 sufficient to allow the peelings and other refuse removed from the vegetables or fruits to be flushed through the gap 23 by the flushing fluid which enters the upper part of the hopper 1 through a pipeline attached to the tapped inlet hole 24. The flushing fluid carrying the refuse drops into the trough-like hopper support 3 and from thence through an opening 25 in the floor 26 into a spout 27 secured to the underside of the floor 26 by bolts 28.

The spout 27 directs the flushing fluid and refuse into the bucket-like trap 5, which, being perforated, retains the refuse but allows the flushing fluid to drain off in the bottom of the trap housing 4, from which the fluid discharges through the drain outlet 6.

A readily detachable door 29 which is preferably transparent closes an aperture 31 provided in the outer wall of the pedestal base 2 to afford access to the peel trap housing 4 in which the strainer 5 stands so that the operator can observe the strainer and remove it for emptying when required, to facilitate which a handle 30 is provided.

The door 29 is held in the aperture 31 by a fixed clip 32 and a rotatable clip 33 which can be turned by a handle 34, the clips 32 and 33 clipping over the edges of the aperture 31.

The hopper 1 is supported upon the hopper support 3 which is disposed intermediate the base 2 of the machine proper and the hopper 1 in such a manner that the hopper 1 can be adjusted or indexed angularly to permit the discharge door 35 for the peeled and cleaned vegetables or fruits to occupy any desired position in relation to the drain outlet 6. This is a considerable advantage in the installation of the machine. The hopper 1 may be securely fixed in a selected position in relation to the hopper base 2 by a pair of quick acting clamps 37. These clamps 37 (of which one only is shown) are arranged diametrically opposite one another, and conveniently at right angles to the discharge door 35, and are readily locked by turning the supporting and clamping screw elements 38.

The hopper support 3 is detachably secured to the top of the base 2 by bolts 39, and has a central gear housing 40 with a conical roof 41 incorporating a bearing boss 42 for the upper part of the vertical shaft 12 to which is keyed the spur gear wheel 11.

At its lower end the vertical shaft 12 is supported in a bearing boss 43 which depends downwardly from the top plate 44 of the base 2, the downward thrust being taken in a thrust bearing consisting of a hard ball 45 mounted in the bottom end of the shaft 12 and a hard peg 46 mounted in an adjustable plug 47 screwed into the lower end of the boss 43 and locked in the adjusted position by nut 48.

The upper and lower bearing sleeves 49, 50 respectively of the vertical shaft 12 are of the graphite impregnated type and surrounded by oil channels 51, 52 to ensure equal lubrication over a long period. Oil is supplied to the channels 51 through a passage 53 in the upper bearing housing 40 and through a passage 54 in the top plate 44 of the base 2 communicating with the bearing boss 43.

The door 35 is pivotally hung from a pivot pin 55 passing through a hole in a bracket 56 formed integral with the door 35 and through aligned holes in a pair of cheek lugs 56 formed integral with the hopper 1. A hand grip 58 is pivoted eccentrically on pin 59 provided at the lower end of the bracket 56, so that in closing the tray-like door 35 the resilient joint ring 60 in the roll edge of said door 35 is jammed on to the lip surrounding the door opening 61 to provide a fluid tight joint. A delivery chute 62 is formed around the bottom and sides of the opening 61.

In the use of the machine the flushing fluid is turned on and enters the hopper 1 through the hole 24 and the motor 8 started for the purpose of rotating the turn-table 13 and thereafter the vegetables or fruits to be peeled and cleaned are fed into the hopper 1 through the aperture 15 provided for this purpose. The effect of the rotation of the turn-table 13 is to subject the whole of the surfaces of vegetables or fruits to an abrasive action, and the flushing fluid causes the peelings and other refuse removed therefrom to pass through the gap 23 between the peripheral edge of the turn-table 13 and the hopper 1 into the hopper support 3 and thence by way of the opening 25 and spout 27 into the strainer 5 in which the solid particles are retained and the water permitted to pass onto the drain outlet 6. When it is desired to empty the hopper 1, the handgrip 58 is swung up to cause the door 35 to open, this being done while the turn-table 13 is still rotating so that this motion automatically discharges the peeled and cleaned vegetables or fruits through the discharge opening 61. A further batch of vegetables or fruits may then be fed into the hopper 1 through the feed aperture 15 for treatment in the machine.

In order to prevent peelings and other refuse accumulating on the floor 26 of the trough-like hopper support 3 one or more cleaning paddles may be suspended below the turn-table 13, the shape of the paddle conforming substantially to the cross sectional form of the annulus constituted within the support 3 by the upstanding gear housing 41, so as to sweep through the floor opening 25 any refuse which lies unaffected by the action of the flushing fluid.

Further, the refuse strainer 5 may be mounted on the door 29 which latter may be detachable or hinged to the base 2, so that the strainer 5 is moved out of the trap housing 4 when the door 29 is removed or opened. As shown, the strainer has a series of perforations in the upper portion thereof substantially above the bottom, the lower wall of the strainer being left imperforate to form a collecting area for peelings and refuse while allowing the collected fluid to overflow to the outlet.

What I claim is:

1. A machine for peeling and cleaning vegetables and fruits comprising a generally annular casing forming a base having an enclosed chamber therein, a hopper support surmounting said base and having a discharge outlet in the lower portion thereof within said casing and opening into said enclosed chamber, a hopper having an open bottom surmounting said hopper support, an abrasive disc rotatably supported in said hopper and closing the open bottom thereof except for a peripheral clearance between the edge of said disc and the wall of said hopper for the escape of flushing fluid and refuse to said discharge outlet of said hopper support, drive means for said disc positioned in said enclosed chamber, means forming a drain outlet from said enclosed chamber for said flushing fluid, a peel trapping strainer, and means for supporting said strainer within said chamber in laterally spaced relation with said drive means in position to receive the discharge from said discharge outlet to strain solid materials from said flushing fluid while allowing said fluid to pass to said drain outlet.

2. A machine as specified in claim 1 wherein the hopper is provided with a discharge door and which includes means adjustably mounting said hopper on said base for relative adjustable relation therebetween to vary the angular location of said discharge door with respect to said base, and means for securing said hopper in predetermined angularly adjusted position upon said base.

3. A machine for peeling and cleaning vegetables and fruits comprising a generally annular casing forming a base having an enclosed chamber therein, a hopper surmounting said base, means forming a discharge outlet from said hopper into said enclosed chamber within said casing and located adjacent the side of said base, an abrasive disc rotatably supported in said hopper in inwardly spaced relation with the wall of said hopper to leave a peripheral clearance between the edge of said disc and said hopper wall for the escape of flushing fluid and refuse to said discharge outlet, drive means for said disc positioned in said enclosed chamber, means forming a drain outlet for said flushing fluid from said enclosed chamber, a peel trapping strainer, means supporting said strainer within said enclosed chamber in laterally spaced relation with said drive means in position to receive the discharge from said discharge outlet and to strain solid material therefrom while allowing said flushing fluid to pass to said drain outlet, and a removable closure in the wall of said base adjacent said discharge outlet to provide access to said strainer for removal and emptying of the same.

4. A machine as defined in claim 3 wherein said strainer has a series of perforations in the upper portion thereof substantially above the bottom, the bottom and the lower portion of the side walls of said strainer being imperforate to form a collecting area for solid material while allowing the collected fluid to overflow to said drain outlet.

HARRY REID HETHERINGTON.

REFERENCES CITED

The following references are of record in the file of this patent:

UNITED STATES PATENTS

| Number | Name | Date |
|---|---|---|
| 809,582 | Robinson | Jan. 9, 1906 |
| 859,842 | Robinson | July 9, 1907 |
| 860,349 | Brenizer | July 16, 1907 |
| 1,031,735 | Robinson | July 9, 1912 |
| 1,053,319 | Robinson | Feb. 18, 1913 |
| 1,902,506 | Johnston et al. | Mar. 21, 1933 |
| 1,923,806 | Anstiss | Aug. 22, 1933 |
| 2,043,873 | Wright | June 9, 1936 |
| 2,186,672 | Fromm | Jan. 9, 1940 |
| 2,299,020 | Jones | Oct. 13, 1942 |
| 2,302,138 | Nicholson | Nov. 17, 1942 |

FOREIGN PATENTS

| Number | Country | Date |
|---|---|---|
| 334,728 | Great Britain | Sept. 11, 1930 |